April 25, 1950     L. BRÉGUET ET AL     2,505,381
DISCONTINUOUS CONTROL TRANSMISSION
Filed March 25, 1947
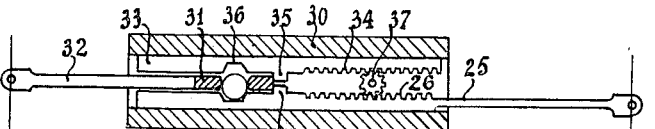
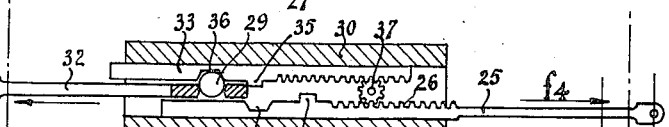
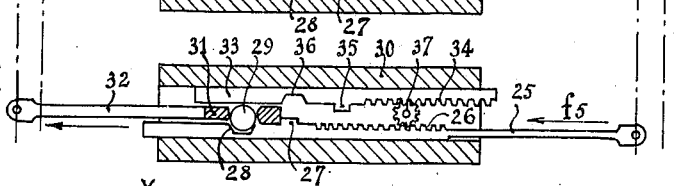
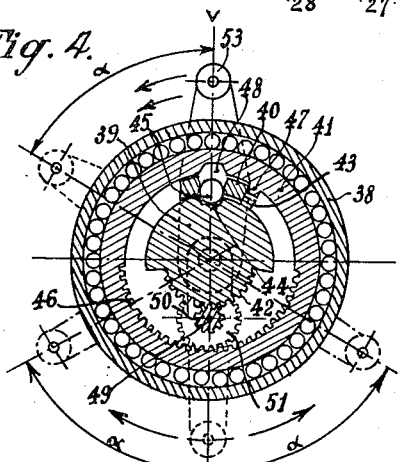
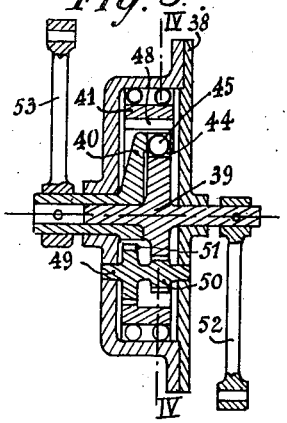
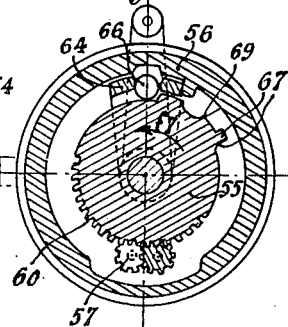
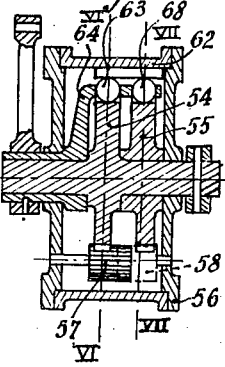
INVENTOR
Louis Bréguet & René Devillers
By Watson, Cole, Grindle & Watson Patented Apr. 25, 1950

2,505,381

UNITED STATES PATENT OFFICE 2,505,381

DISCONTINUOUS CONTROL TRANSMISSION

Louis Breguet and René Devillers, Paris, France;
said Devillers assignor to said Breguet Application March 25, 1947, Serial No. 736,898
In France April 5, 1946

5 Claims. (Cl. 74—469)

When one control is to act on different members, it may happen that the total driving stroke is not used for the control of all the members considered and that a certain staggered control is provided by the successive starting of different leverages during a single control operation.

Up to the present such staggered operation has generally been obtained through tractional or compressional stresses with antagonistic elastic return means after the manner of cams and pusher members. The chief drawback of such arrangements is to double at least the control stresses as the elastic return should overcome the passive resistances at the receiver end. Moreover when the control is not yet or no longer operative i. e. during the dead or idle interval the locking is provided solely through the action of a spring urging the linkage against a stop. The consequence is a lack of reliability which is not consistent inter alia in aeronautics with the application to rotary sails, to the control of air screw pitches, of upper surface interceptors, of firing means and the like.

Our invention has chiefly for its object to ensure a positive connection between primary and secondary linkages with means for effecting a reversal of the secondary movement at a predetermined point of the controlling stroke. In particular, such an arrangement is applicable to the fuel controlling lever in the power means used for the propulsion of aircrafts or helicopters with variable pitch propellers and allow for instance a change of sense of the control pitch from a normal positive setting by executing a return stroke of the lever so as to pass through the extreme idling point after which the flow of fuel is restored while the propeller is set at a negative pitch, which requires simultaneously a discontinuous transmission with a locking during the idle interval and a reversal of the fuel control.

According to the present invention there is provided a control linkage for obtaining successive movements of a driven member, first in one direction and then in the other, from movement of a driving member in one direction only, in which said driven member is adapted to be alternately locked to said driving member and to an intermediate member, said intermediate and driving members being connected kinematically for assuming movements in opposite directions.

The locking of the driven member to the driving and intermediate members may be effected by means including a ball or roller associated with the driven member and notches and stops on the driving and intermediate members.

The invention is illustrated by way of example in the accompanying drawings in which:

Figs. 1, 2, and 3 illustrate diagrammatically a linkage according to our invention adapted to change the direction of the secondary movement over a part of the stroke of the primary movement.

Figs. 4 and 5 are cross-sections respectively through lines IV—IV of Fig. 5 and V—V of Fig. 4, and illustrate a circular modification of the reversing means shown diagrammatically in Figs. 1 to 3.

Figs. 6, 7, and 8 illustrate a modification of the reversing gear providing for holding up the secondary movement during any desired duration; said figures are respectively cross-sections through VI—VI and VII—VII of Fig. 8 and an axial cross-section through the reversing gear.

Referring to Figures 1 to 3 controlling rod 25 is provided with a rack 26, a stud 27 and a notch 28 adapted to receive the ball 29. The rod 25 slides inside the guide 30 at the same time as the cage 31 connected with the secondary leverage 32 and also the auxiliary rod 33 carrying the rack 34, the stud 35 and the notch 36. A small free pinion 37 carried by a spindle rigid with the guiding member 30 meshes with both the racks 26 and 34; it reverses the movements of the rod 25 with reference to the auxiliary rod 33.

Fig. 1 shows the arrangement at the middle of its travel. From this position onwards, when the rod 25 is driven towards the right according to the arrow f4 of Fig. 2 the auxiliary rod 32 urges the cage 31 through its notch 35 so that the ball 29 urged into the upper notch 36 connects the rod 33 and the cage 31. The secondary linkage 32 is thus driven towards the left. If the rod 25 moves towards the left as shown in Fig. 3 in the direction of the arrow f5, the ball 29 enters the notch 28 and locks the rod 25 and cage 31 together so that the linkage 32 is again urged towards the left; consequently starting from the middle position shown in Fig. 1, the displacement of the rod 25 in either direction always produces the same action on the linkage 32. Consequently also if the rod 25 starts from its extreme right hand position illustrated in Fig. 2 in order to reach an extreme left position such as that shown in Fig. 3, the secondary linkage 32 starting from its left hand position will move towards the right and reach the middle position of Fig. 1 after which it returns into its starting position.

The movement is therefore reversed and the sum of the absolute values of the opposite translational movements of the secondary linkage is equal to that of the primary linkage 25.

Figs. 4 and 5 illustrate, in the case of circular movements, the application of the above described reversal of the movement, as disclosed for rectilinear movement.

A stationary casing 23 encloses a sector 39, a cage 40, and a ring shaped member 41 of which the different axes of rotation coincide. The sector 39 carries teeth at 42 and also a stud 43 and a notch 44 inside which may be housed the ball 45 held inside the cage 40. The ring shaped member 41 is also provided with internal teeth 46, with a stud 47 and with a notch 48 adapted to also receive the ball 45. A transmission 49 with two pinions 50 and 51 provides for the reverse rotations of the sector 39 and of the ring shaped member 41, the angular strokes of which may be equal or otherwise. Mere inspection of Figs. 4 and 5 will allow ascertaining that a continuous rotation of the lever 52 rigid with the sector 39 will transmit to the lever 53 rigid with the cage 40 two movements of opposite directions, the position of reversal corresponding to the point where the notches and studs register with one another.

In the case where the amplitudes of the reverse rotations of the sector 39 and of the ring shaped member 41 should be very different, their association may be obtained by replacing the double pinion by a single pinion as in the rectilinear form of execution given out by way of example in Figs. 1 to 3.

Our invention also permits a reversal of the secondary movements to be effected allowing a stationary period in the movements, that is an idle or dead period in the primary stroke during which the secondary linkage remains stationary and is locked. Figs. 6, 7 and 8 show by way of indication how such an arrangement may be obtained through the locking of the secondary linkage to two associated movable parts and to a stationary part.

In the construction of Figs. 6 to 8. two identical segments 54 and 55 lie side by side in a stationary casing 56 and their rotations are associated through a reversing gear constituted by pinions 57 and 58 and teeth 59 and 60 cut in the segments 54 and 55.

When the segment 54 is caused to rotate in the direction of the arrow f6, its notch 61 registers with the notch 62 of the casing 56 while the cage 64 abuts against the stationary stud 65 and a ball 63 urged into the notch 62 provides for the locking of the cage with reference to the casing until the slope 66 registering in its turn with the notch 62 allows it to be disengaged. The same locking of the cage with reference to the casing is produced at the same time by the segment 55 moving in a reverse direction and the ball 68 cooperating with the latter enters the stationary notch forming an extension of the notch 62. The release is obtained when the cage 64 is urged in the direction of the arrow f7 under the action of the stud 67 on the segment 55, following which the ball 68 enters the notch 69 and thus releases the cage 64 which is driven along in the direction of the arrow f7.

It is apparent that this arrangement allows, when the primary segment 54 passes from one of its extreme positions to the other, say clockwise, the cage 64 controlling the secondary linkage first to accompany it in its travel and then to stop during the time required for the ball 63 to pass over the fraction of a segment comprised between the notch 61 and the slope 66 after which it starts in the opposite direction under the action of the segment 55.

In accompanying claims, the word "ball" should be construed as covering any equivalent rolling member, roller, roll or the like.

What we claim is:

1. A transmission of movement, adapted to produce movements in opposite directions, comprising a cylindrical stationary casing, a shaft axially journalled in said casing, a rotatable driving member rigidly secured to said shaft, two intermediate rotatable members mounted in said casing coaxially with said shaft, provided each with a notch and a stop, and adapted to be simultaneously and positively controlled by said shaft in opposite directions, a driven member, a ball cage rigid therewith and adapted to rotate about said shaft, and means including at least a ball, for connecting said cage with either of said intermediate members.

2. A transmission of movement adapted to produce movements in opposite directions comprising a cylindrical stationary casing, a shaft axially journalled in said casing, a rotatable driving member rigidly secured to said shaft, two intermediate rotatable members mounted in said casing coaxially with said shaft, provided each with a notch and a stop, and adapted to be simultaneously and positively controlled by said shaft in opposite directions, the stops respectively carried by said intermediate members facing one another in the position for which the notches face one another, a driven member, a ball cage rigid therewith, adapted to rotate about said shaft between said intermediate members, a ball carried by said cage and adapted to project selectively to either side thereof into the notch of the corresponding intermediate member, said ball being urged into either notch under the action of the thrust of the stop carried by the member provided with the notch considered.

3. A transmission of movement adapted to produce movements in opposite directions comprising a cylindrical stationary casing, a shaft axially journalled in said casing, a rotatable driving member rigidly secured to said shaft, two intermediate rotatable members mounted in said casing coaxially with said shaft, provided each with a notch, a stop and a toothed portion, one of said intermediate members being positively controlled by said shaft, a reversing gear, meshing with said toothed portions and constraining said intermediate members to rotate in opposite directions, the stops respectively carried by said intermediate members facing one another in the position for which the notches face one another, a driven member, a ball cage rigid therewith, adapted to rotate about said shaft between said intermediate members, a ball carried by said cage and adapted to project selectively to either side thereof into the notch of the corresponding intermediate member, said ball being urged into either notch under the action of the thrust of the stop carried by the member provided with the notch considered.

4. A transmission of movement adapted to produce movements in opposite directions with an intermediary idle period, comprising: a cylindrical stationary casing, a shaft axially journalled in said casing, a rotatable driving member rigidly secured to said shaft, two intermediate rotatable members mounted side by side in said casing, coaxially with said shaft, and adapted to be simultaneously and positively controlled by said shaft in opposite directions, a driven member, a ball cage rigid therewith and adapted to rotate about said shaft, between on one hand, said intermediate members and, on the other hand, said casing, a notch and a stop provided side by side on said stationary casing, a notch provided on each intermediate member, a stop on each said member, adapted to face the stop on the stationary casing when the corresponding notches register, one at least of said intermediate members being provided with a cam shaped recessed slope, a ball contained in said cage in front of each of the intermediate members and adapted to project selectively to either side thereof into the notch of the corresponding intermediate member or into the notch of the stationary casing, each ball being held in succession in the corresponding notches and one ball at least being released from the stationary casing as it passes in front of the cam shaped slope in the opposite intermediate member, the length of said slope corresponding to the length of the idling period.

5. A transmission of movement adapted to produce movements in opposite directions with an intermediary idle period comprising: a cylindrical stationary casing, a shaft axially journalled in said casing, a rotatable driving member rigidly secured to said shaft, two intermediate rotatable members mounted side by side in said casing, coaxially with said shaft and having a toothed portion, one of said intermediate members being positively controlled by said shaft, a reversing gear meshing with said toothed portions and constraining said intermediate members to rotate in opposite directions, a driven member, a ball cage rigid therewith and adapted to rotate about said shaft, between, on one hand, said intermediate members and, on the other hand, said casing, a notch and a stop provided side by side on said stationary casing, a notch provided on each intermediate member, a stop on each said member, adapted to face the stop on the stationary casing when the corresponding notches register, one at least of said intermediate members being provided with a cam shaped recessed slope, a ball contained in said cage in front of each of the intermediate members and adapted to project selectively to either side thereof into the notch of the corresponding intermediate member or into the notch of the stationary casing, each ball being held in succession in the corresponding notches and one ball at least being released from the stationary casing as it passes in front of the cam shaped slope in the opposite intermediate member, the length of said slope corresponding to the length of the idling period.

LOUIS BREGUET.
RENÉ DEVILLERS.

REFERENCES CITED

The following references are of record in the file of this patent:

UNITED STATES PATENTS

| Number | Name | Date |
|---|---|---|
| 1,510,128 | Allen | Sept. 30, 1924 |